United States Patent [19]

Harrelson, Jr.

[11] 4,175,991
[45] Nov. 27, 1979

[54] TIRE RETREADING METHOD

[75] Inventor: Albert A. Harrelson, Jr., Asheboro, N.C.

[73] Assignee: Harrelson Rubber Company, Asheboro, N.C.

[21] Appl. No.: 851,205

[22] Filed: Nov. 14, 1977

[51] Int. Cl.$^2$ .............................. B29H 17/36
[52] U.S. Cl. ........................ 156/96; 156/286; 156/382
[58] Field of Search ............ 156/96 110 R, 123 R, 156/126–129, 285–287, 381, 382, 394; 264/36, 315, 316, 326

[56] References Cited

U.S. PATENT DOCUMENTS

| | | | |
|---|---|---|---|
| 2,976,910 | 3/1961 | Nowak | 156/96 |
| 3,703,422 | 11/1972 | Yoshino | 156/286 |
| 3,793,116 | 2/1974 | Schelkman | 156/394 |
| 3,884,740 | 5/1975 | Schelkman | 156/96 |
| 3,894,897 | 7/1975 | Batchelor et al. | 156/96 |

FOREIGN PATENT DOCUMENTS

| | | | |
|---|---|---|---|
| 746375 | 3/1956 | United Kingdom | 156/96 |
| 1277642 | 6/1972 | United Kingdom | 156/96 |

*Primary Examiner*—John E. Kittle
*Attorney, Agent, or Firm*—Joseph H. Heard

[57] ABSTRACT

A flexible envelope having a central portion overlying a replacement tread strip upon the tire to be retreaded has marginal edge portions overlying bands of cushion gum material upon opposite sidewalls of the tire. During the initial phase of subsequently-ensuing treatment of the aforesaid tire assembly within a heated pressure chamber, the bands of cushion gum material undergo plastic flow and create fluid-tight sealed relationships between the overlying marginal edge portions of the envelope and the underlying tire sidewalls. The bands are removed from the tire sidewalls and envelope after completion of the chamber-treatment of the assembly, and preferably before cooling thereof to ambient room temperature.

10 Claims, 2 Drawing Figures

TIRE RETREADING METHOD

BACKGROUND OF THE INVENTION

This invention pertains to tire retreading operations of the type wherein a flexible envelope member is used to form a fluid-tight enclosure about a replacement tread strip encircling the circumferential surface of a used tire and adapted to be permanently bonded thereto during treating of the aforesaid assembly within a heated pressure chamber. The invention more specifically relates to the manner of achieving the necessary fluid-tight, sealed condition of the envelope enclosure.

It is well known that, in tire retreading operations of the foregoing type, a satisfactory permanent bond will not reliably ensure between a replacement tread strip and a tire to be retreaded if air and/or other fluid is present in the bonding region between the strip and the tire during the treatment thereof within a heated pressure chamber. It is also known to form an enclosure about such region by means of a flexible envelope having venting means associated therewith by which air or the like can be evacuated once the necessary fluid-tight sealed relationship of the envelope about the region has been established. The prior art suggests a number of different ways of achieving the necessary fluid-tight sealed condition of the flexible envelope. One such way is by the use of mechanical clamping devices having thereon opposed clamping surfaces between which marginal edge portions of the envelope are secured: See, e.g., U.S. Pat. Nos. 3,966,535, 3,846,201 and 3,802,978. This technique is highly reliable, in that realization of the desired fluid-tight sealed relationship is not dependent upon the particular surface characteristics of the tire to be retreaded or upon a precise relationship between the size of the envelope and the size of the tire. However, clamping devices of the aforesaid kind are relatively expensive to acquire, maintain and use: In the latter regard, their use-cost is particularly high when the clamping devices are so constructed as to not permit retreading of a tire while the same is mounted upon the customer's rim, but rather requires de-mounting of the tire from such rim prior to the retreading operation, and subsequent re-mounting of the tire upon such rim following retreading.

Another prior-art envelope-sealing technique involves mechanically clamping one or more portions of the envelope against one or more surface portions of the carcass of the tire to be retreaded: See, e.g., U.S. Pat. Nos. 2,976,910 (FIGS. 1–6 embodiments), 3,779,832, and 3,884,740. While certain devices employing this technique may be somewhat less expensive to acquire, maintain and use than devices of the first type described above, they do not as reliably establish the necessary fluid-tight sealed condition of the envelope and, in some instances, require the use of specially-designed heated chambers which are capable of accommodating only a single tire at a time. It is of course much more economical and desirable, in the latter regard, for the envelope sealing means to be of such nature as to permit a number of tires to be simultaneously treated in a heated pressure chamber of large room-like construction.

U.S. Pat. No. 3,769,121 discloses the retreading in a chamber of the above-described type of a tire enclosed by a flexible envelope which extends completely about the tire carcass and the replacement tread strip thereon, and which has its marginal edge portions in overlapped relationship to each other. A similarly-constructed and arranged "full-wrap" envelope is disclosed in U.S. Pat. No. 2,966,936. Apart from the questionable reliability of the seal achieved thereby, the foregoing arrangement cannot be used for the retreading of a tire mounted upon the customer's rim, and requires utilization of a relatively large envelope of special design and construction.

Use of a smaller-size envelope, apparently without the accompanying use of any clamping device or means, is disclosed in U.S. Pat. No. 3,976,910 (FIG. 6a embodiment) and in British Pat. No. 746,375. Although the British patent states that "wetting of, or the application of a little adhesive to the surfaces . . . will be found to improve the seal," primary reliance for the establishment of a sealed relationship between the envelope and the tire sidewalls apparently is predicated, in the tire-retreading methods of both patents, upon a tight contractive fit between the envelope and the components enclosed by it. Such arrangement necessitates a retreader's acquisition, maintenance and selective use of a large number of envelopes whose sizes are closely correlated to all of the different-sized tires to be retreaded. Further, each of the envelopes must possess a high degree of resilient contractability and, unless frequent replacement is envisioned, should be capable of retaining such property even after undergoing repeated heating during use. Considerable expense would be entailed in the acquisition of envelopes of the foregoing type and, since each would have to be stretched into place, in their use. Furthermore, the sidewalls of a tire to be retreaded frequently have irregular surface portions, due either to "gouges" or the like arising from prior use of the tire, or due to the presence of molded size-indicia or other lettering thereon. It is highly doubtful that the retreading technique of the patents would produce a sealed relationship between the envelope and a tire having irregular sidewall surfaces even if the envelope were tightly stretched, and even if the confronting surfaces of the envelope and tire sidewalls were "wetted" or had "a little adhesive" applied thereto.

Commonly-owned and partially-corresponding U.S. Pat. No. 3,689,337 and British Pat. No. 1,277,642 relate to a chamber-type of retreading process wherein a preliminary connection is made, in the vicinity of each lateral edge of an intervening layer of binder material, between the replacement tread strip and tire components of an assembly thereafter subjected to chamber treatment. In the first embodiment of the patents the preliminary connection is made by use of a heating ring which effects vulcanization of the edges of the layer of binder material and which, prior to its aforesaid usage, is employed to mechanically clamp an enclosing envelope or sheet against the tire. Additional embodiments disclose or suggest effecting the desired preliminary innerconnection of components in other ways, some of which entail use of one or more "sheets," "foils" or "covers" which are "bonded," "glued," "welded" or "molded" in place. In each instance, however, the desired preliminary innerconnection of the components of the assembly is apparently completed in all respects prior to commencement of the assembly's treatment within the heated pressure chamber.

U.S. Pat. Nos. 3,904,459 and 3,989,563 are directed to obviating the use of a flexible envelope in chamber-type retreading operations. They advocate, to this end and among other things, securing the replacement tread strip upon the outer circumference of a tire to be retreaded by means of a layer of binder material which, due to preheating and/or a special composition, has a greater plasticity than the conventional cushion gum binder normally used in tire retreading operations. The patents correctly state that the conventional binder material lacks sufficient plasticity at ambient room temperatures to adequately fill all air-entrapping depressions which might be present within the surfaces of a tire to which the material is applied. Although the patents are directed as previously noted to elimination of the use of a flexible envelope or "evacuation jacket" in the tire retreading operation, such an envelope or jacket is disclosed in one embodiment: However, the manner of achieving sealed relationships between the marginal edges of the envelope or jacket and the underlying sidewalls of the tire carcass is not indicated.

Other prior U.S. patents of possible relevance to the present invention are U.S. Pat. Nos. 3,935,045, 3,895,985, 3,894,897 and 3,793,116.

SUMMARY OF THE INVENTION

The tire retreading method of the present invention comprises an improvement upon that method of the known type wherein heat and pressure are applied within a chamber to a previously prepared assembly comprised of a tire carcass, a replacement tread strip encircling the circumferential surface of the carcass, and a vented flexible envelope having a central portion overlying the tread strip and marginal edge portions overlying respective one of the tire sidewalls. When the replacement tread strip is formed of precured rubber, as is normally the case in tire retreading operations of the type in question, the assembly further conventionally includes a layer of cushion gum binder material, consisting primarily of uncured rubber, between the confronting surfaces of the replacement tread strip and the tire carcass circumference. In accordance with the present invention the aforesaid assembly is further provided at the time of its formation with first and second annular bands of cushion gum binder material. The bands preferably have width and thickness dimensions of approximately two inches and at least one-sixteenth inch, respectively, and are interposed between respective ones of the envelope marginal edge portions and the tire sidewalls overlaid thereby. Since the cushion gum material of the bands may be and preferably is of conventional composition, it possesses a sufficiently high degree of "tackiness" and a sufficiently low degree of plasticity at room temperature to permit the bands thereof to be quickly and easily applied and adhered to the sidewalls of the tire prior to the flexible envelope being placed thereover. Stitching forces may be and preferably are imposed, as by means of a hand roller, to the envelope marginal edge portions then placed over the cushion gum bands. This insures temporary adherence between the envelope marginal edge portions and the bands, and thus renders it unnecessary to rely, for realization of such result, upon the use of an envelope possessing a precise size and/or high degree of resilient contractability. The stitching also causes any cavities within the underlying surfaces of the tire sidewalls to be at least partially filled by the cushion gum material of the bands. However, the stitching forces do not cause a fluid-tight sealed relationship to be established between the envelope marginal edge portions and the underlying tire sidewalls by the intervening bands of cushion gum material. The limited degree of plasticity of the cushion gum material of which the bands are formed renders the latter totally incapable, at room temperatures, of undergoing sufficient plastic flow to establish fluid-tight sealed relationships between the envelope marginal edge portions and the tire sidewalls overlaid thereby. Nor is any attempt made, by preliminary heating or by the use of clamping members or otherwise, to establish a fluid-tight sealed relationship between the aforesaid components of the thus-formed assembly prior to its placement within a conventional chamber of the type wherein heat and pressure are adapted to be applied thereto. Following placement of the assembly within the chamber and the connection to the flexible envelope of venting means such as is conventionally associated therewith, increase of the temperature and pressure within the chamber are then initiated in a conventional manner. As the temperature within the chamber rises, it has been found that the cushion gum material of the bands will undergo increased plastic flow and will, for the first time, create fluid-tight sealed relationships between the envelope marginal edge portions and the tire sidewalls overlaid thereby. This will occur at a chamber temperature of approximately 150 degrees F. when the cushion gum material binder material is of conventional composition. Upon establishment in the aforesaid manner of a sealed fluid-tight relationship between the envelope margins and the tire sidewalls, a condition of low pressure (in relation to the chamber pressure) can be and is created and maintained within the envelope by the venting means connected thereto. The chamber treatment of the assembly then is continued in conventional fashion; i.e. air or other fluid is evacuated from the region sealingly enclosed by the envelope, through the venting means associated therewith, while the chamber temperature and pressure further increase to their final desired magnitudes and then are maintained thereat for a period of time sufficient to effect permanent bonding of the replacement tread strip to the tire. This normally will occur in approximately five to six hours at a chamber temperature and pressure of approximately 210 degrees and 80–85 PSI, respectively. After the aforesaid chamber treatment of the assembly has been completed, the chamber is re-opened and the flexible envelope and the bands of now-vulcanized cushion gum material are removed from the retreaded tire. Preferably this is done before the assembly cools to ambient room temperature, and while its retained-heat temperature is approximately 150 degrees F., since it has been found that the bands may be readily "peeled" or "stripped" from the tire sidewalls and the envelope margins when the aforesaid components are still heated to some extent. The surprising ease with which the bands can be removed is also believed attributable, at least in part, to the fact that the confronting surfaces of the tire sidewalls and envelope margins are not subjected to oxide-removing "buffing" or similar treatment during formation of the assembly, and therefore have oxide films thereon which discourage permanent bonding of the bands thereto.

The method of the present invention reliably achieves a fluid-tight sealed relationship between the envelope marginal edge portions and underlying tire sidewalls even if the surfaces of the latter have indicia or other irregularities thereon. It does not require the use of clamping devices, curing rims, specially constructed or precisely sized envelopes, or specially formulated cushion gum material. Additionally, the only heating involved in the practice of the method of the invention is that which occurs in the conventional chamber treatment of the assembly: No additional or preliminary heating of the assembly, or any of its components, is required.

DESCRIPTION OF THE DRAWING

Other features and benefits of the invention will be apparent from the following description of an illustrative embodiment thereof, which should be read in conjunction with the drawing, in which.

DESCRIPTION OF THE PREFERRED EMBODIMENT

Figure 1:
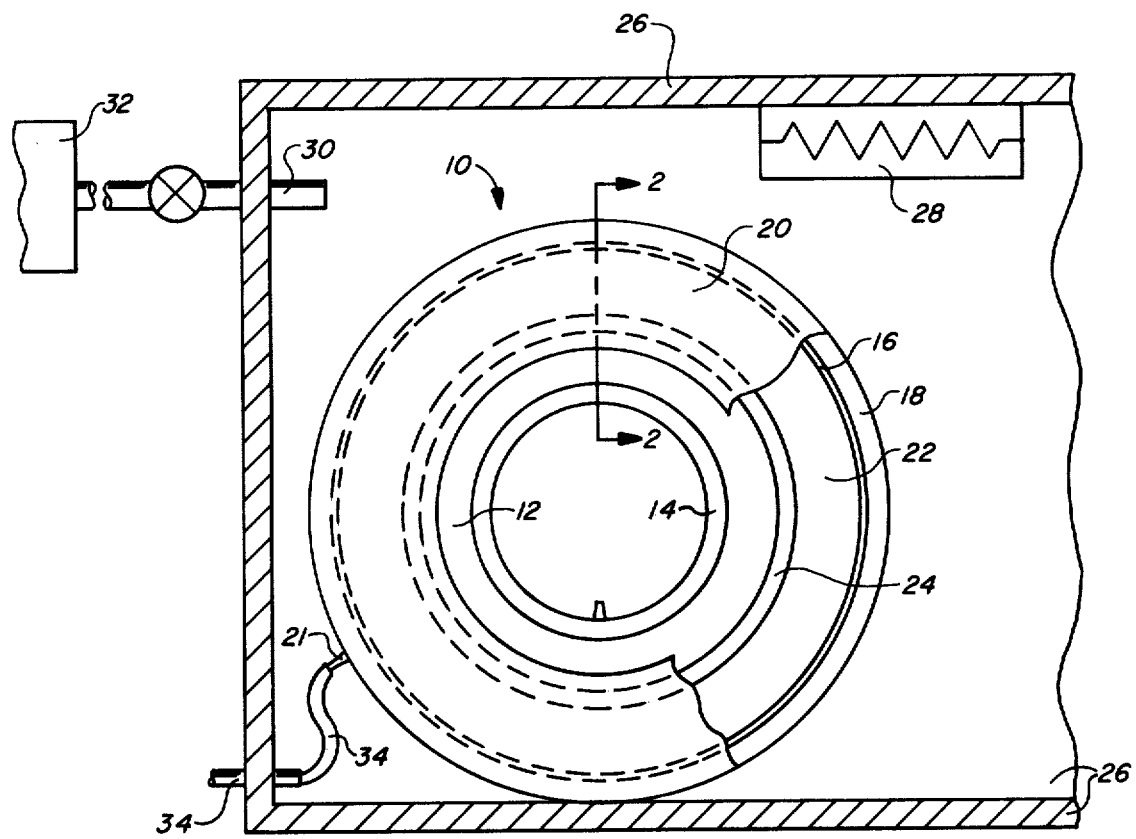
FIG. 1 is a side elevational view of a tire assembly, the flexible envelope component of which is partially broken-away, formed in accordance with the present invention and disposed within a fragmentarily and partially-schematically shown chamber such as is conventionally employed for tire retreading operations of the type in question.
Figure 2:
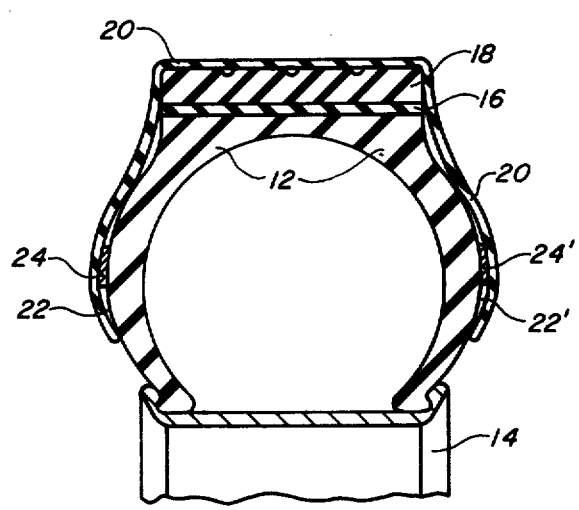
FIG. 2 is an enlarged sectional view, taken approximately along the line 2—2, through the tire assembly of FIG. 1.

Referring more particularly to the drawing, the assembly 10 shown in FIGS. 1 and 2 includes a tire 12 mounted upon a rim 14. While a truck tire and rim are shown, this is for purposes of illustration only, and the tire and rim might be of any types. In preparation for its retreading, the circumferential surface of tire 14 has been buffed and then successively encircled by a layer 16 of cushion gum binder material and by a replacement tread strip 18. Tread strip 18 may be and illustratively is formed of relatively hard precured tread rubber. The cushion gum binder material of layer 16 is of conventional, commercially-available composition, and is comprised primarily of uncured rubber.

In addition to the foregoing conventional components, assembly 10 further conventionally includes a flexible envelope 20 which is of generally U-shaped cross-sectional configuration, and has an exhaust-valve element 21 thereon. Envelope 20 may be easily formed in a known manner from a rubber innertube, and illustratively is of such economical construction. When added to assembly 10, the central portion of envelope 20 encirclingly overlies replacement tread strip 18, while the marginal edge portions of the envelope overlie respective ones of the opposite sidewalls 22,22' of tire 12.

The thus-far described components and steps used in the preparation of assembly 10 are conventional and well known to those skilled in the art. Further explanation thereof is therefore deemed unnecessary to an understanding of the present invention, to be now described.

In accordance with the present invention assembly 10 is further provided, at the time of its formation and between respective ones of the tire sidewalls 22,22' and the overlying marginal edge portions of envelope 20, with annular bands 24,24' of cushion gum binder material. Bands 24,24' are preferably placed upon the respective tire sidewalls 22,22', without any preliminary buffing of other oxide-removing treatment of such sidewalls, prior to the addition to assembly 10 of envelope 20. Each band 24,24' is spaced radially inwardly from the circumferential surface of tire 12 and from the layer 16 and strip 18 encircling such surface. The bands 24,24' preferably are situated approximately centrally of the tire sidewalls 22,22', upon the "crown" areas thereof, as shown in the drawing. The cushion gum material of which bands 24,24' are formed may be and preferably and illustratively is of conventional composition, being comprised primarily of uncured rubber. When formed of conventional or equivalent composition, bands 24,24' possess sufficient structural integrity as to readily permit convenient manual handling and application thereof to the respective tire sidewalls 22,22', and further possess sufficient "tackiness" as to then adhere to the respective tire sidewalls 22,22' even when the confronting underlying surfaces of such sidewalls have not been subject to a buffing or similar operation effective to remove oxide film therefrom.

Following the aforesaid affixation of bands 24,24' to tire sidewalls 22,22', envelope 20 is placed in its illustrated association with the other components of assembly 10. This step may be readily accomplished since the present invention does not necessitate or rely upon a precise "snug" or "contractive" fit between envelope 20 and the other components of assembly 10 enclosed thereby. After envelope 20 is in place, stitching forces are preferably applied, as by means of a hand roller (not shown) or the like, to the envelope marginal edge portions which directly overlie bands 24,24'. This step is desirable for two reasons. Firstly, it insures contact and temporary adherence between the aforesaid envelope marginal edge portions and the bands 24,24', even when envelope 20 is of a relatively loose fitting type and its surfaces have oxide film thereon. Secondly, it insures that any irregularities or cavities within the surfaces of the tire sidewalls 22,22' immediately underlying bands 24,24' will be at least partially filled by the cushion gum material of the bands. In the foregoing connection, the thickness of bands 24,24' is sufficiently great, preferably being at least approximately one-sixteenth of an inch, to accommodate in the foregoing manner any such surface irregularities or cavities as would normally be upon the tire sidewalls, due to minor surface damage thereof and/or due to the presence of molded indicia thereon. Additionally, the width of bands 24,24', which preferably is approximately two inches, is sufficient for the bands to completely span in a radial direction most if not all of such irregularities or cavities in the tire sidewall surfaces overlaid thereby.

After its formation in the aforesaid manner, assembly 10 is moved to and placed within a chamber 26, such as is schematically and fragmentarily shown in FIG. 1, of a type adapted to subject the assembly to treatment at an elevated temperature and pressure for the purpose of effecting permanent bonding, by vulcanization of layer 16, of tread strip 18 to tire 12. Associated with chamber 26 are heater means 28 for heating the chamber; fluid-inlet means 30 for introducing pressurized fluid, such as air, into the chamber from an external source 32; and conduit means 34 adapted to be connected at one to the exhaust-valve element 21 upon envelope 20. The opposite end of conduit means 34, which end is disposed exteriorally of chamber 26, may be open to the ambient atmosphere (as shown) or, if desired, may be connected to a vacuum pump or the like (not shown). In lieu of the illustrated arrangement wherein unheated air is introduced into chamber 26 and then heated, preheated air or other fluid, such as steam, might of course be employed.

Following placement of assembly 10 within chamber 26 and the connection of conduit means 34 to envelope element 21, the chamber door or other closure member (not shown) is shut, and heating means 28 and fluid-inlet means 30 are respectively energized and opened. At this immediate point in time the interior of chamber 26 is still at ambient room temperature, and at such temperature the bands 24,24' of assembly 10 lack sufficient plasticity to form, and do not form, fluid-tight sealed relationships between the confronting marginal edge portions of envelope 20 and the tire sidewalls 22,22'. However, as the temperature and pressure within chamber 26 increase, the cushion gum material of bands 24,24' softens, undergoes increasing plastic flow and then creates, for the first time, fluid-tight sealed relationships between the confronting marginal edge portions of envelope 20 and the underlying adjacent surfaces of tire sidewalls 22,22'. Such result occurs well prior to the attainment within chamber 25 of the ultimately-desired curing temperature, which usually is approximately 210 degrees F., and will normally ensue when the chamber temperature is approximately 150 degrees F. Following establishment of the aforesaid sealed relationship between the marginal edge portions of envelope 20 and sidewalls 22,22', the venting effect of conduit means 34 can and then does create a fluid-evacuating condition of relative low pressure, in relation to the chamber pressure, within the region enclosed by envelope 20 and lying radially outwardly of bands 24,24'. This of course is the desired result.

The chamber temperature and pressure continue to increase to their final desired magnitudes, which conventionally are approximately 210 degrees F. and 80–85 PSI, and then are maintained thereat for a sufficient period of time, usually about five to six hours, sufficient to effect complete vulcanization of the layer 16 of cushion gum material by which replacement tread strip 18 is bonded to the circumferential surface of tire 12. During this period of time the bands 24,24' also undergo complete vulcanization. Notwithstanding this fact, however, it has been found that after the chamber-treatment of assembly 10 has been completed, and the supplying of pressurized air and heat to the interior of chamber 26 has been terminated, the bands 24,24' can be readily stripped or "peeled" from tire sidewalls 22,22' and from envelope 20, particularly if such removal of the bands is performed before assembly 10 is allowed to completely cool from its elevated curing temperature to ambient room temperature. Preferably removal of the bands from the other components of assembly 10 is effected while the retained-heat temperature thereof is approximately 150 degrees F. The ease with which bands 24,24' can be removed is also believed to be attributable in significant part to the fact that the envelope and tire-sidewall surfaces in engagement therewith were not subject during formation of assembly 10 to any buffing or similar treatment effective to remove surface-oxide therefrom.

Following its separation from bands 24,24' and removal from assembly 10, envelope 20 may be used again, in the same manner previously described, in other retreading operations.

While an illustrative embodiment of the invention has been specifically shown and described, it is to be understood that this was for purposes of illustration only, and not for purposes of limitation, the scope of the invention being in accordance with the following claims.

That which is claimed is:

1. In a tire retreading method of the type including the formation of an assembly comprised of a tire, a layer of cushion gum binder material and an overlying replacement tread strip encircling the circumferential surface of said tire, and a flexible envelope having a central portion overlying said replacement tread strip and marginal edge portions overlying the sidewalls of the tire; said tread strip being adapted to be permanently bonded to said tire by treatment of said assembly within a chamber having means associated therewith for elevating the temperature and pressure therewithin, and for evacuating fluid from beneath said envelope; the improvement comprising:

providing said assembly, prior to its treatment within said chamber, with first and second annular bands of cushion gum binder material respectively extending between said envelope marginal edge portions and said tire sidewalls overlaid thereby; said bands of cushion gum binder material being ineffective, prior to treatment of said assembly within said chamber, to establish fluid-type sealed relationships between said envelope marginal edge portions and said tire sidewalls;

placing the assembly within said chamber;

increasing the temperature and pressure within said chamber to cause plastic flow of said bands of cushion gum material and thereby to cause the same to then establish fluid-tight sealed relationships between said envelope marginal edge portions and said tire sidewalls overlaid thereby;

evacuating fluid from beneath said envelope following the establishment within said chamber of said fluid-tight sealed relationships between said envelope marginal edge portions and said tire sidewalls overlaid thereby;

maintaining said assembly at an elevated temperature and pressure within said chamber for a period of time sufficient to cause permanent bonding of said tread strip to said tire, and then terminating the chamber treatment of the assembly;

and removing said envelope and said bands from said assembly following termination of said chamber treatment thereof.

2. A method as in claim 1, wherein said bands are removed from said assembly before cooling thereof to ambient room temperature following termination of said chamber treatment.

3. A method as in claim 2, wherein said bands are removed from said assembly while the temperature thereof is approximately 150 degrees F.

4. A method as in claim 1, wherein the step of providing said assembly with said bands comprises adhering said bands upon respective ones of said tire sidewalls, and thereafter placing said envelope marginal edge portions in overlying relationship to said bands and said tire sidewalls.

5. A method as in claim 1, and further including applying stitching forces to said envelope marginal edge portions overlying said bands of cushion gum material prior to the step of increasing the temperature and pressure within said chamber.

6. A method as in claim 1, wherein said bands have a width of approximately two inches and a thickness of at least approximately one-sixteenth inch, and wherein the step of providing said assembly with said bands includes positioning said bands approximately centrally of said tire sidewalls in radially spaced relationship to said circumferential surface of said tire.

7. A method as in claim 1, wherein the establishment of said fluid-tight sealed relationships occurs when the temperature within said chamber reaches approximately 150 degrees F.

8. A method as in claim 1, wherein the step of providing said assembly with said bands includes adhering said bands upon surface portions of said tire sidewalls which are unbuffed and which are disposed approximately centrally thereof; then placing said envelope marginal edge portions in overlying relationship to said bands and to said tire sidewalls; and then applying stitching forces to said envelope marginal edge portions directly overlying said bands.

9. A method as in claim 8, wherein the step of removing said bands from said assembly is performed before cooling of said assembly to ambient room temperature following termination of said chamber treatment thereof.

10. A method as in claim 9, wherein the step of removing said bands is performed while the temperature of said assembly is approximately 150 degrees F.

* * * * *